(12) United States Patent (10) Patent No.: US 11,057,748 B1
Zoller (45) Date of Patent: Jul. 6, 2021

(54) PRIORITIZED COMMUNICATION WINDOWS IN A WIRELESS MESH NETWORK

(71) Applicant: Synapse Wireless, Inc., Huntsville, AL (US)

(72) Inventor: Jeremy Jacob Zoller, Huntsville, AL (US)

(73) Assignee: Synapse Wireless, Inc., Huntsville, AL (US)

( * ) Notice: Subject to any disclaimer, the term of this patent is extended or adjusted under 35 U.S.C. 154(b) by 0 days.

(21) Appl. No.: 16/133,237

(22) Filed: Sep. 17, 2018

(51) Int. Cl.
*H04W 4/12* (2009.01)
*H04W 72/10* (2009.01)
*H04W 72/08* (2009.01)
*H04W 84/18* (2009.01)
*H04L 12/24* (2006.01)
*H04L 12/58* (2006.01)

(52) U.S. Cl.
CPC ........... *H04W 4/12* (2013.01); *H04L 41/0893* (2013.01); *H04L 51/38* (2013.01); *H04W 72/087* (2013.01); *H04W 72/10* (2013.01); *H04W 84/18* (2013.01)

(58) Field of Classification Search
CPC combination set(s) only.
See application file for complete search history.

(56) References Cited

U.S. PATENT DOCUMENTS

| | | | |
|---|---|---|---|
| 6,934,752 B1 * | 8/2005 | Gubbi | H04L 29/06027 370/392 |
| 7,801,169 B2 * | 9/2010 | Haartsen | H04L 47/10 370/347 |
| 7,970,871 B2 | 6/2011 | Ewing et al. | |
| 8,553,561 B1 | 10/2013 | Chokshi et al. | |
| 9,298,954 B1 | 3/2016 | Ewing | |
| 9,619,989 B1 | 4/2017 | Ewing et al. | |
| 2002/0163933 A1 * | 11/2002 | Benveniste | H04L 47/10 370/465 |

(Continued)

OTHER PUBLICATIONS

Mogre, et al.,"QoS in Wireless Mesh Networks: Challenges, Pitfalls, and Roadmap to its Realization," Mutltimedia Communications Lab (KOM) Dept. of Electrical Engineering and Information Technology, Technische Universitaet Darmstadt, Germany.

*Primary Examiner* — Yee F Lam
(74) *Attorney, Agent, or Firm* — Maynard Cooper & Gale, P. C.; Jon E. Holland

(57) ABSTRACT

A wireless network may include a server, a network, a network access device and a plurality of nodes configured to communicate wirelessly. Messages may be communicated through the network wirelessly in an uncoordinated manner. Some nodes may be assigned a first priority indicating that the node has a higher priority than other nodes assigned a second priority. During a certain time period or window, referred to as a "quality of service window," nodes assigned the first priority may continue transmitting in the uncoordinated manner, while nodes associated with the second priority may wait to transmit their messages until after the expiration of the quality of service window. Thus, during the quality of service window, there should be less congestion since nodes assigned the second priority remain quiet, thereby increasing the likelihood that messages transmitted by the nodes assigned the first priority will be successfully communicated.

11 Claims, 3 Drawing Sheets

(56) References Cited

U.S. PATENT DOCUMENTS

| | | | |
|---|---|---|---|
| 2003/0235179 A1* | 12/2003 | Tuomela | H04W 72/02 370/347 |
| 2005/0135295 A1* | 6/2005 | Walton | H04L 69/08 370/328 |
| 2005/0141548 A1* | 6/2005 | Koo | H04W 72/1242 370/462 |
| 2006/0056382 A1* | 3/2006 | Yamada | H04W 28/18 370/349 |
| 2007/0110092 A1 | 5/2007 | Kangude et al. | |
| 2008/0095124 A1* | 4/2008 | Ramos | H04L 47/14 370/336 |
| 2008/0205276 A1* | 8/2008 | Inukai | H04B 7/18584 370/235 |
| 2009/0010202 A1* | 1/2009 | Masayuki | H04L 5/0007 370/328 |
| 2009/0103501 A1* | 4/2009 | Farrag | H04W 74/02 370/337 |
| 2011/0305208 A1* | 12/2011 | Wu | H04W 72/1247 370/329 |
| 2017/0171878 A1* | 6/2017 | Chun | H04B 7/0404 |
| 2017/0223665 A1* | 8/2017 | Chun | H04B 7/0695 |
| 2018/0026806 A1 | 1/2018 | Greunen et al. | |

\* cited by examiner

US 11,057,748 B1

PRIORITIZED COMMUNICATION WINDOWS IN A WIRELESS MESH NETWORK

RELATED ART

Asynchronous communication is frequently used among nodes in wireless mesh networks. In such a network, the nodes of the network do not attempt to maintain synchronization and communicate in an uncoordinated manner resulting in many data collisions. Indeed, during periods of network congestion, data may be lost and/or significant delays may occur.

In an effort to reduce data collisions, some wireless networks rely on techniques for allocating time periods for nodes to communicate. For example, in a Time Division Multiplexed (TDM) system, some nodes are assigned fixed periods during which they are permitted to communicate while other nodes are not allowed to communicate. However, in a TDM system, communication is typically synchronized among nodes. This approach may result in fewer data collisions, but synchronization of node communication requires additional messages to maintain precise timing relationships and increases the complexity and often expense of the nodes. Further, delays may occur as a node must wait for a timeslot allocated to it before transmitting, sometimes resulting in inefficient usage of available bandwidth.

Techniques for increasing network efficiency and alleviating problems caused by network congestion are generally desired.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to a wireless network with prioritized communication windows. In some embodiments, a wireless network may include a server, a network, a network access device and a plurality of nodes configured to communicate wirelessly. Messages may be communicated through the network wirelessly in an uncoordinated manner. That is, the nodes may be configured to communicate messages asynchronously and at various random times without the use of a coordinator. In this regard, each node decides on its own when to transmit, and any number of nodes may decide to transmit at about the same time resulting in data collisions.

Each of the nodes may be assigned at least one priority. Some nodes may be assigned a first priority indicating that the node has a higher priority than other nodes assigned a second priority. The nodes assigned the first priority may be associated with critical functions or routes frequently transmitting high-priority traffic. During a certain time period or window, referred to herein as a "quality of service window," nodes assigned the first priority may continue transmitting in the uncoordinated manner, while nodes associated with the second priority may wait to transmit their messages until after the expiration of the quality of service window. When the quality of service window ends, all nodes of the network may resume communication in an uncoordinated manner. Thus, during the quality of service window, there should be less congestion since nodes assigned the second priority remain quiet, thereby increasing the likelihood that messages transmitted by the nodes assigned the first priority will be successfully communicated.

Figure 1:
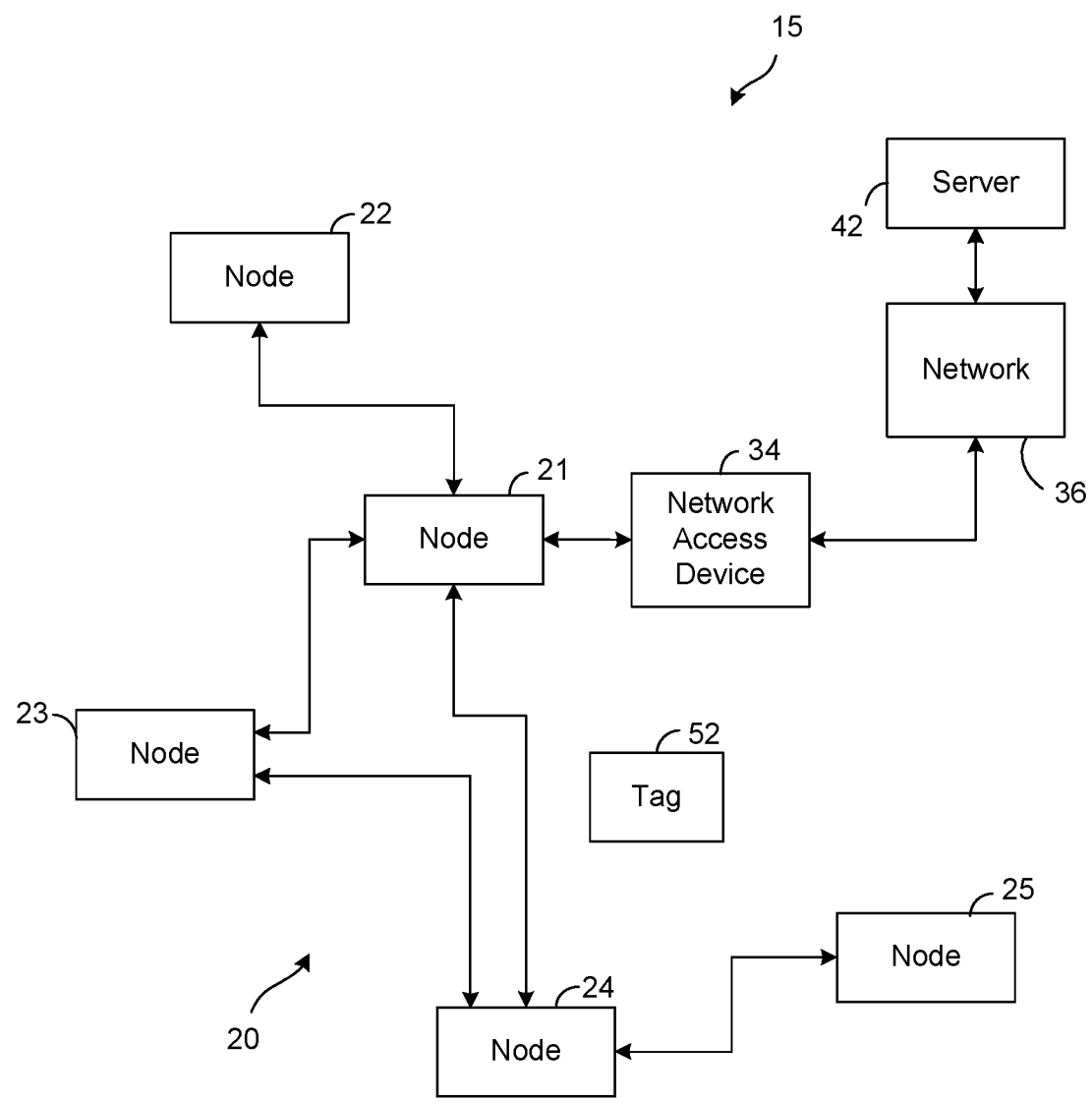
FIG. 1 is a block diagram illustrating an exemplary embodiment of a wireless control system in accordance with the present disclosure.

FIG. 1 shows an embodiment of a wireless control system 15. The system 15 may be implemented in various environments, but in some embodiments, the system 15 is implemented at a facility such as a manufacturing plant, office, healthcare facility, educational institution, factory or warehouse. As shown by FIG. 1, the system 15 can include a wireless sensor network 20. In one embodiment, the network 20 can be implemented as a mesh network, but other types of networks may be implemented in other embodiments. Some examples of networks that can be used with the present application are described in: commonly-assigned U.S. Pat. No. 7,970,871, entitled "Systems and Methods for Dynamically Configuring Node Behavior in a Sensor Network," and granted on Jun. 28, 2011; and commonly-assigned U.S. Pat. No. 9,619,989, entitled "Asset Tracking Systems and Methods," and granted on Apr. 11, 2017, both of which patents are incorporated herein by reference.

The network 20 can include nodes 21-25 to facilitate communication between a server computer 42 and components of the control system 15. In one embodiment, the nodes 21-25 of the control system 15 can be initially configured to perform control functions for various systems, such as a lighting control system to control components of a lighting system at the facility. In other embodiments, the nodes 21-25 of the control system can be initially configured as a pneumatic control system to monitor and control components of a pneumatic system at the facility or an asset tracking system to locate and identify assets, e.g., people and/or objects, in the facility. An example of node behavior in a mesh network that can be used with the present application is described in: commonly-assigned U.S. Pat. No. 9,619,989, entitled "Asset Tracking Systems and Methods," and granted on Apr. 11, 2017. Regardless of the initial configuration of the nodes 21-25 of the control system 15, the nodes 21-25 of the control system 15 can be configured for operation in one or more of the lighting control system, the pneumatic control system, the asset tracking system, or any other application.

The components of the control system 15 can include tags 52, communication devices 33 and any other components used with a wireless control system (e.g., a pneumatic control system or an asset tracking system). In the embodiment of FIG. 1, five nodes 21-25, one tag 52, and one communication device 33 are depicted for simplicity, but the network 20 may have any number of nodes 21-25, any number of tags 52, and any number of communication devices 33 in other embodiments.

Each node 21-25 is able to communicate with any of the other nodes 21-25. In one embodiment, the nodes 21-25 can communicate among one another wirelessly, i.e., via electromagnetic or acoustic waves carrying a signal, but it is possible for any of the nodes 21-25 to communicate over a conductive medium, e.g., a wire or fiber, or otherwise.

Messages may hop from node-to-node in order to reach a destination. In the embodiment shown by FIG. 1, nodes 21, 23 and 24 are within range of each other such that any of the nodes 21, 23 and 24 can communicate directly with any of the other nodes 21, 23 and 24. However, node 22 is only within range of node 21 and node 25 is only within range of node 24. Nodes 23-25 can use node 21 to route or otherwise transmit a message to node 22 and nodes 21-23 can use node 24 to route or otherwise transmit a message to node 25.

The nodes 21-25 can be configured to communicate asynchronously. In this regard, instead of using a coordinator to allocate transmission time periods, as is done in systems using TDM network communication, messages of the network 20 may be communicated between nodes 21-25 or from nodes 21-25 to tag 52 in an uncoordinated manner for which each node determines when to transmit its messages. In an effort to reduce data collisions, the nodes 21-25 may be configured to introduce randomness (e.g., jitter) into transmission times. As an example, before retransmitting a multicast message, a node may be configured to add a random delay to reduce the likelihood that it will try to retransmit the multicast at the same time as a neighboring node that likely heard the multicast message at the same time.

In some embodiments, data collisions may further be reduced by creating time periods ("windows") during which communication in the network 20 is restricted to only traffic having at least a certain priority. Messages that are not prioritized for transmission within a window must wait until after the window period closes. In the context of this document, such a time period (window) may be referred to as a "Quality of Service" (QoS) window. As will be described in more detail below, the nodes 21-25 may receive one or more messages indicating when the QoS window will begin and/or end.

As described in further detail below, a node 21-25 may have a priority setting assigned to it and may reference the priority setting to determine whether it is prioritized for communicating its messages during a QoS window. If so, the node may continue to communicate in an uncoordinated manner during the window. If not, the node may wait to communicate its messages until after the QoS window ends. That is, a node only can transmit during the QoS window if it has a sufficient priority so that network traffic is reduced by allowing only high priority traffic to continue during a QoS window.

At least one of the nodes 21-25 can be communicatively coupled to a network access device 34 through which the nodes 21-25 communicate in order to access a network 36, such as a local area network (LAN), wide area network (WAN) or the Internet. The network access device 34 can interface messages between the protocol of the network 20 and the protocol of the network 36. The server 42 can be connected to the network 36 to communicate with the nodes 21-25 and components of the network 20 via the network access device 34. The server 42 can be provisioned to know the network configuration, including the network address or identifier of the nodes 21-25, the tag address or identifier of the tags 52, the communication device address or identifier of the communication devices 33 and any other nodes of the network 20. In other embodiments, the server 42 may be configured to dynamically learn the network configuration.

In one embodiment, the nodes 21-25 can be stationary. However, in other embodiments, one or more of the nodes 21-25 may be mobile. Each node 21-25 may be positioned at a specific location within a facility, such as a warehouse or other building. Each node 21-25 may be assigned to a specific location within the facility (e.g., a particular room or area of a building).

The system 15 can also include at least one mobile node, referred to herein as a "tag," 52 that can wirelessly communicate with the nodes 21-25 as the tag 52 is moved through the area(s) of the facility at which the nodes 21-25 are positioned. The tag 52 can be attached to or positioned on an asset (e.g., a person or object) in order to track the movements of the asset. In addition, a tag identifier can be associated with an asset in order to determine the identity of the asset. In one embodiment, the tag 52 can include one or more processors to execute instructions for controlling the operation of the tag 52. In addition, the tag 52 can have a communication module for communicating wirelessly with nodes 21-25 and a power supply, such as a battery, to provide electrical power to the components of the tag 52. The tag 52 can be a node of the network 20, but in some embodiments, the tag 52 is not configured to route messages through the network 20. In other words, the tag 52 may transmit network messages to and receive network messages from nodes 21-25, but the tag 52 is not used as an intermediate hop for network messages that do not identify the tag 52 as the source or destination for the message in order to conserve the power resources of the tag 52. Exemplary tags and techniques for asset tracking are described by U.S. Pat. No. 9,619,989 referenced above.

Figure 2:
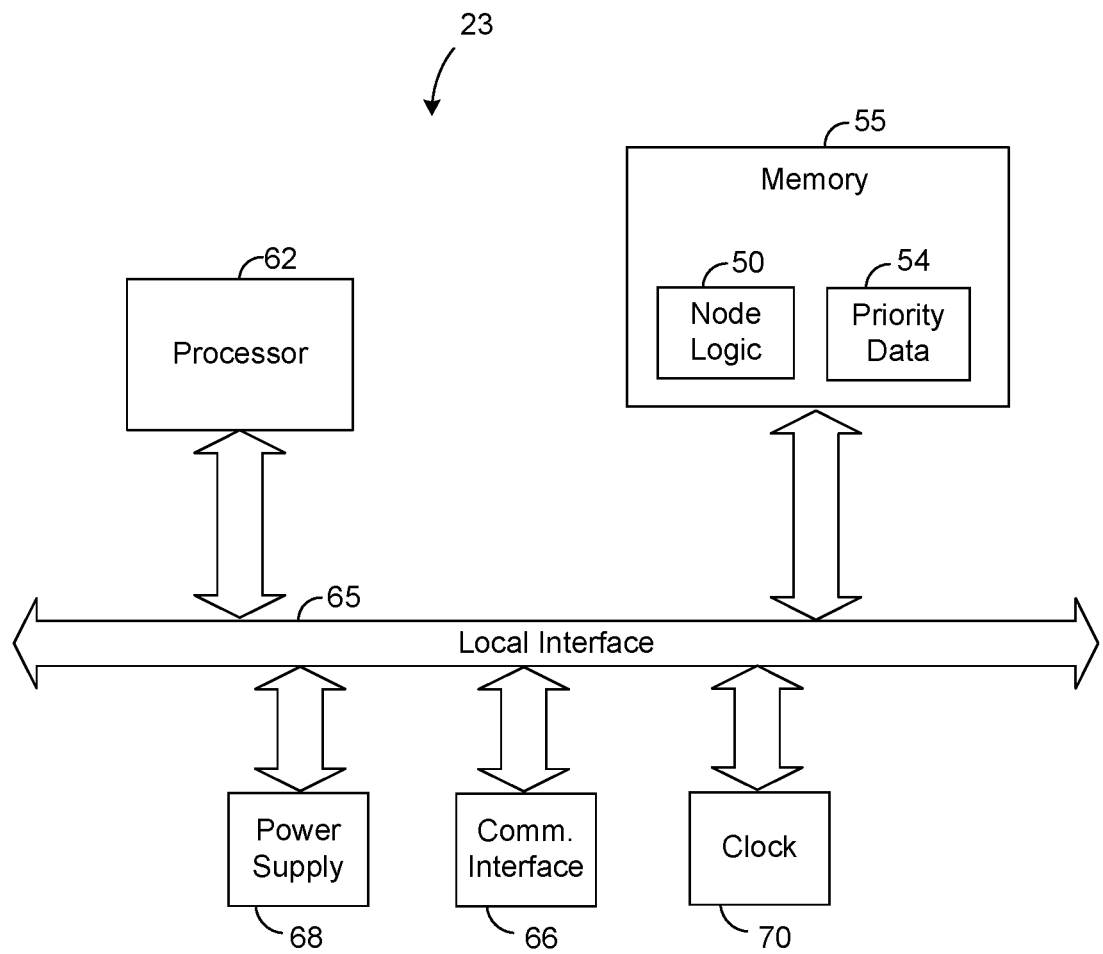
FIG. 2 is a block diagram illustrating an exemplary embodiment of a node of a wireless network, such as is depicted by FIG. 1.

FIG. 2 depicts an embodiment of one of the nodes used in network 20. Note that any of the other nodes may be configured similarly or identical to the node depicted by FIG. 3. The node 23 includes at least one conventional processor 62, which includes processing hardware for executing instructions stored in the memory 55. As an example, the processor 62 may include a central processing unit (CPU) or a digital signal processor (DSP). The processor 62 communicates to and drives the other elements within the node 23 via a local interface 65, which can include at least one bus.

The node 23 also has a communication interface 66. The communication interface 66 includes a radio frequency (RF) radio or other device for communicating wirelessly. Using the communication interface 66, the node 23 may communicate with a tag 52, another node 21, 22, 24, 25, a communication device 33 or a network access device 34.

The node 23 can have a power supply 68, which provides electrical power to the components of the node 23 as well as potentially to resources of a sub-system of system 15 with which the node 23 is associated. In one embodiment, the power supply 68 has an interface that allows it to plug into or otherwise interface with an external component, such as a wall outlet or battery, and receive electrical power from such external component. If desired, the power supply 68 may incorporate one or more batteries to permit the node 23 to be independent of the external power component.

As shown by FIG. 2, the node 23 further comprises a clock 70. In one exemplary embodiment, the clock 70 is asynchronous relative to the clocks of the other nodes 21-25. The clock 70 may be used to determine the timing of QoS windows, as will be described in more detail hereafter. As an example, the network access device 34 or other type of device may be configured to transmit a timing beacon that marks the timing of one or more QoS windows. Such timing beacon may be a multicast message that is retransmitted through the network by the nodes, although the timing beacon can be another type of message in other embodiments. The reception of the timing beacon by a node may mark a beginning. As an example, a QoS window may occur immediately upon receiving the timing beacon or a predefined time after reception of the timing beacon. The receiving node may use its clock 70 to track when the QoS window is to begin and end. In other embodiments, other techniques for determining the timing of the QoS windows are possible.

Priority data 54 can be stored in memory 55 and can indicate one or more priority settings for node 23. The priority settings can be one or more settings from a priority scheme stored at server 42. The node 23 can determine whether it is permitted to transmit during a QoS window by referencing its priority setting in priority data 54. As with node 23, for each node 21-25, the priority data 54 can identify at least one priority setting for the node 21-25. As will be described in more detail below, each priority setting may indicate a priority assigned to the node for transmitting at least one message type. In some embodiments, each node 21-25 of the network 20 may be assigned at least one priority setting, and various numbers of settings are possible. The server logic 111 can transmit messages with information relating to the priority data 54 to the node 23 over the network 20. These messages can be used by the logic 50 to update the priority setting for the node 23 stored in priority data 54 as may be desired.

The node 23 shown by FIG. 2 can include logic 50, referred to herein as "node logic," for generally controlling the operation of the node 23. The node 23 also may include component logic (not specifically shown in FIG. 2) for controlling any component (e.g., tag 52, or resources of one or more sub-systems of system 15) that may be connected to the node 23. In other embodiments, this component logic can be combined with control logic 50.

The node logic 50 may be implemented in software, firmware, hardware, or any combination thereof. In FIG. 2, the node logic 50 is implemented in software and stored in memory 55. However, other configurations of the node logic 50 are possible in other embodiments. Note that the node logic 50, when implemented in software, can be stored and transported on any computer-readable medium for use by or in connection with an instruction execution apparatus that can fetch and execute instructions. In the context of this document, a "computer-readable medium" can be any non-transitory means that can contain or store code for use by or in connection with the instruction execution apparatus.

The node logic 50 may be configured to receive a timing beacon indicating when a QoS window will occur and determine whether the node 23 can communicate during the QoS window based on its priority setting. In some embodiments, the node logic 50 can receive a timing beacon from the gateway 33 but any node or other device may be configured to transmit the timing beacon in other embodiments. The logic 50 also may determine how long the QoS window will last (e.g., a duration) if the node 23 has insufficient priority to transmit and thus must wait until the QoS window expires before resuming transmission.

Node logic 50 can decide whether transmission during a QoS window is permitted for node 23 by noting its priority settings stored in priority data 54. Node logic 50 can reference one or more priority settings it has been assigned that are stored in priority data 54 and determine whether any of its assigned priorities permits it to transmit during the QoS window. If so, the logic 50 determines that transmission is permitted and continues to transmit its messages during the QoS window in an uncoordinated manner. That is, timing of the messages transmitted during the QoS window is not controlled by an external coordinator implementing some type of time-division multiplexing algorithm among the nodes, but rather is determined by the nodes that are transmitting the nodes such that data collisions within the QoS window are possible. If the logic 50 has not been assigned a priority that permits it to transmit in the QoS window, the logic 50 determines that it must wait until the QoS window expires to transmit. Based on this determination, the node 23 either continues to transmit in an uncoordinated manner during the QoS window if it is permitted to do so based on its priority, or waits until the end of the QoS window if not.

As noted above, communication in the network 20 may be uncoordinated, and thus, each node 21-25 may be configured to determine on its own when to transmit and, in particular, whether it is permitted to transmit during a QoS window based on its priority settings. Thus, upon transmission of a timing beacon, nodes 21-25 assigned a priority setting (e.g., high priority) for which transmission is permitted during a QoS window may determine that transmission is permitted based on their priority without need for further communication or coordination. Also, nodes 21-25 assigned a priority setting (e.g., low priority) for which transmission is not permitted during a QoS window may determine that transmission is not permitted based on their priority without needing to communicate further.

Figure 3:
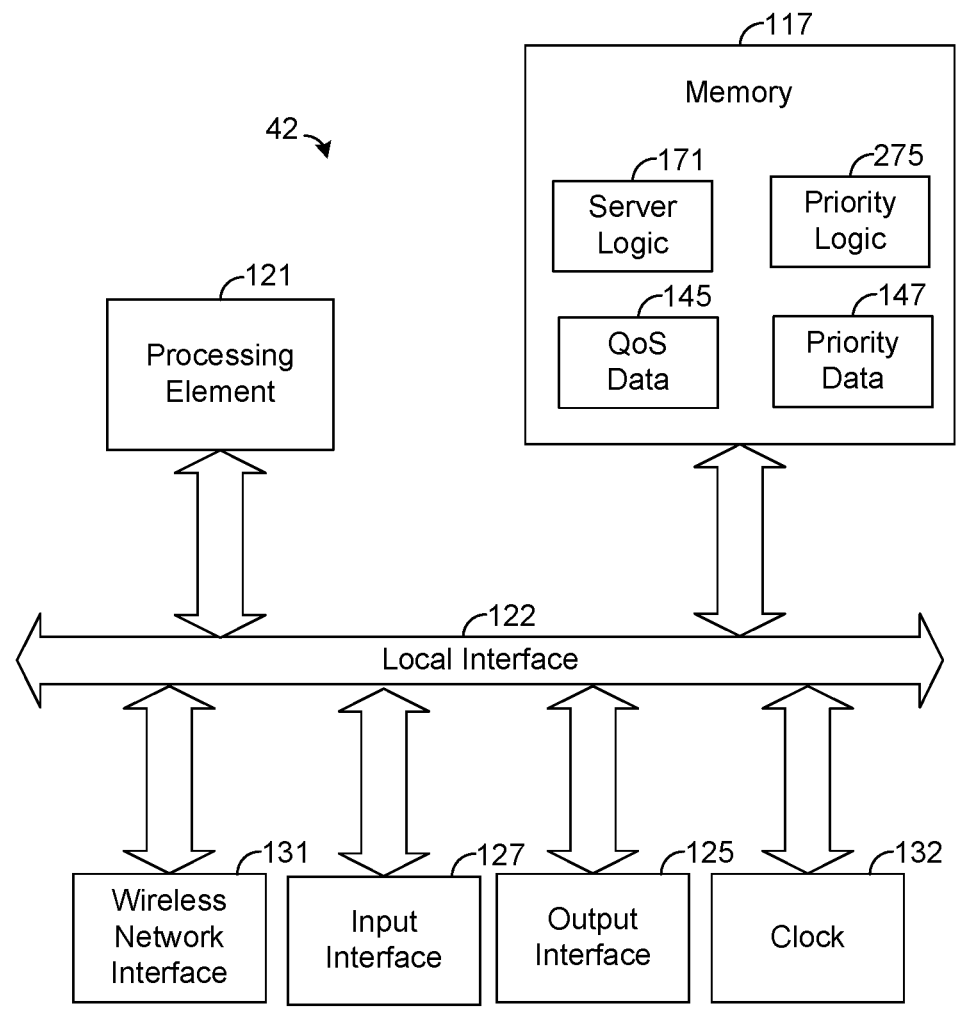
FIG. 3 is a block diagram illustrating an exemplary embodiment of a server, such as is depicted by FIG. 1.

FIG. 3 shows an embodiment of the server 42. The server 42 can include at least one conventional processor 121, which has processing hardware for executing instructions stored in memory 117. As an example, the processor 121 may include a central processing unit (CPU) or a digital signal processor (DSP). The processor 121 communicates to and drives the other elements within the server 42 via a local interface 122, which can include at least one bus. Furthermore, an input interface 127, for example, a keypad, keyboard or a mouse, can be used to input data from a user of the server 42, and an output interface 125, for example, a printer, monitor, liquid crystal display (LCD), or other display apparatus, can be used to output data to the user.

The server 42 also comprises a wireless network interface 131 for enabling the server 42 to communicate wirelessly with other devices. In one exemplary embodiment, the network interface 131 communicates RF signals but other types of signals may be communicated in other embodiments. The server 42 further comprises a clock 132.

As shown by FIG. 3, QoS data 145 and priority data 147 can be stored in memory 117 at the server 42. The QoS data 145 can include data indicating when a QoS window should occur. For example, QoS data 145 can indicate conditions (e.g., transmission-boosting events, etc.) when transmission of high-priority traffic is desirable and when other traffic may be temporarily stopped. The QoS data 145 also can include data indicating characteristics of QoS windows, such as window duration and data indicating an amount of time following receipt of a timing beacon at a node 21-25 when the QoS window will occur. The QoS data 145 can also include data indicating one or more message priorities for which transmission is permitted within the QoS window.

The priority data 147 can include data indicating priority assigned to nodes of the network 20 (e.g., node 21-25). The priority data 147 can also indicate priority assigned to various types of messages that may be communicated by nodes of the network (e.g., node 21-25). The priority data 147 may include other information about priority assigned to nodes or messages of network 20 for use and/or analysis by priority logic 275 and/or server logic 171. In some embodiments, data from the network access device 34, tag 52, or nodes 21-25 of the network 20 indicating priority assigned to them or their messages also can be stored in memory as priority data 147 for use and/or analysis by the server logic 171 or priority logic 275.

The server 42 can include logic 171, referred to herein as "server logic," for generally controlling the operation of the server 42, including communicating with the nodes 21-25 of the network 20. The server 42 also includes priority logic 275, to assign priority to each node of the network 20. The server logic 171 and priority logic 275 can be implemented in software, hardware, firmware or any combination thereof. In the server 42 shown in FIG. 3, the server logic 171 and priority logic 275 are implemented in software and stored in memory 117 of the server 42. Note that the server logic 171, and the priority logic 275, when implemented in software, can be stored and transported on any non-transitory computer-readable medium for use by or in connection with an instruction execution apparatus that can fetch and execute instructions.

In addition to controlling operations of the server 42, server logic 171 can process the QoS data 145 to implement QoS windows. The server logic 171 can determine whether a QoS window should occur and alert the network access device 34 to send timing beacons to nodes 21-25 to synchronize their clocks. The server logic 171 can use information from nodes 21-25 about conditions indicating that a QoS window should occur, such as detection of high network congestion periods, a high-priority condition, or communication from a node associated with a high priority function for which transmission of high-priority traffic is essential. For example, the server 42 may determine that an alarm has been triggered at a node (e.g., a sensor coupled to the node has detected a fire, valve failure, etc.) and may implement a QoS window to allow high-priority messages to be transmitted through the network 20. The server logic 171 can also identify characteristics of the QoS window, such as based on information indicative of the condition that triggers the QoS window. In some embodiments, the occurrences of the QoS window may be predefined. As an example, the occurrences of the QoS window may be periodic or otherwise occur according to an algorithm used by the server to determine the when occurrences of QoS windows are desirable.

Priority logic 275 can use priority data 147 to implement a priority scheme for the node 23. The priority logic 275 can determine a priority setting for each node of the network 20 and assign the node the determined priority setting by sending the node a message indicating the new priority. The priority logic 275 can use various data when determining and assigning a priority setting for a node, including QoS data 145, priority data 147, or other data indicating a priority of the priority scheme that the particular node should be assigned. For example, the priority logic 275 can use information from the QoS data 145 and priority data 147 to identify when a QoS window should occur and whether the node 23 has been assigned a priority of the priority scheme. If a priority data 147 indicates that a node 23 has not been assigned a priority in the scheme, the priority logic 275 can identify an appropriate priority and assign the node 23 the determined priority (e.g., by transmitting information indicative of the priority to the node via a message or otherwise). As an example, a node coupled to a sensor for monitoring an important or critical condition may be assigned a high priority, and a node coupled to a sensor for monitoring a less important condition may be assigned a low priority.

The priority logic 275 also can determine whether any previously assigned priorities should be changed based on the information in QoS data 145 and priority data 147 (e.g., such as when a condition prompting a QoS window indicates that a node's priority should be changed). As an example, the priority logic 275 can assign a node a higher priority if a condition has been detected that indicates that messages from such node should have a higher priority. The priority logic 275 can assign the node an appropriately higher priority corresponding to the importance of the being monitored by that node and transmit a message to the node indicating the newly assigned priority value. Alternatively, in some embodiments, the priority logic 275 can assign the node a lower priority if information in QoS data 145 and priority data 147 indicates that the priority assigned to the node 23 should be reduced.

In some embodiments, the priority logic 275 also may assign a node a new priority in response to a user input. The user input may be indicative of the new priority that the node should be assigned or may be indicative of a condition indicating that the node's priority should be updated. The priority logic 275 may assign the node a new priority based on the user input. Thus, a network administrator or other user may change the priority setting from time-to-time as may be desired.

Although the above-described examples are generally explained using only one node 23, server logic 171 and priority logic 275 can perform the above functions for any number of nodes 21-25 of the system 15.

As an example of the functionality of system 15, in some embodiments, a QoS window for the system 25 may be an approximately five second interval, although intervals of other durations may be used. To better illustrate aspects of the present disclosure, an exemplary five second QoS window will now be described below.

Assume first that communication in the network 20 is occurring normally. Nodes 21-25 may communicate messages in an uncoordinated manner as described above. That is, the communication of messages of the network 20 is not performed with involvement of a coordinator to assign times for any of the nodes 21-25 to communicate, and each node decides on its own when to transmit messages.

The server 42 may determine that a QoS window should occur based on QoS data 145, in this example, in response to detection of network congestion or other reason, such as according to a predefined schedule of QoS windows. In response, the server 42 may send a message to the network access device 34 indicating the QoS window.

As an example, the network access device 34 (gateway) may transmit a timing beacon that is routed through the system 15 to the other nodes 21-25. The timing beacon may have data indicating when the beginning of the five second QoS window is to occur, as well as the duration of the QoS window. In some embodiments, the timing beacon may be a multicast message that is retransmitted by the nodes 21-25 through the network, but other types of messages are possible for the timing beacon.

Alternatively, the nodes 21-25 may be configured to know the timing of the QoS window relative to the timing beacon. As an example, the nodes 21-25 may be configured to implement the QoS window a predefined amount of time after reception of the beacon so that the timing beacon does not need to include data characterizing the QoS window.

In some embodiments, the network 20 may be configured such that, during the QoS window, the nodes 21-25 may transmit only if they have been assigned a first priority. Otherwise the nodes 21-25 wait to transmit their messages if they have been assigned a second priority instead. Thus, nodes 21-25 may receive the timing beacon and note their assigned priority setting in priority data 54. If a node (e.g., node logic 50) determines that it has been assigned the first priority, then it may continue to transmit during the QoS window. During the QoS window, nodes permitted to continue to transmit may do so in an uncoordinated manner.

Nodes 21-25 may note when the QoS window has expired based on information indicating QoS window duration and the timing beacon. Nodes having the first priority may simply continue transmitting messages in an uncoordinated manner through the expiration of the QoS window. When a node assigned the second priority determines that the QoS window has expired, it may resume transmission of its messages in an uncoordinated manner. Nodes of both the first and second priorities may continue to communicate in an uncoordinated manner until another QoS window occurs.

Note that, in some embodiments, there may be more than one priority setting assigned among nodes. In addition, nodes may be permitted to communicate in more than one QoS window based on their priority setting and the QoS windows. For example, nodes associated with a first priority may be permitted to transmit during all QoS windows. Nodes associated with a second priority may be permitted to transmit in all QoS windows except a first QoS window. Nodes associated with a third priority may be permitted to transmit in all QoS windows except for the first QoS window and a second QoS window. In some embodiments, additional priority settings and QoS windows are possible.

In various embodiments described above, the nodes are assigned respective priorities, and the messages from a given node are prioritized according to its source node's priority. However, in other embodiments, messages from the same node may be associated with different priorities rather than the same priority as is described above. Specifically, some messages from the same node may be prioritized in a manner different than other messages from that node. In such example, the node may communicate high-priority messages in a QoS window, as described above, and refrain from transmitting lower-priority messages in the QoS window. To better illustrate the foregoing, assume that a node is coupled to and monitors (1) a first sensor, referred to hereafter as a "high-priority sensor," that monitors a critical condition for which a rapid notification is desired, and (2) a second sensor, referred to hereafter as a "low-priority sensor," that monitors a less critical condition for which timeliness of a notification is not as important. For example, the high-priority sensor may be used to monitor a temperature of a motor or other component for which a high temperature may indicate an emergency condition in which it is desirable to shut down or otherwise alter the operation of the motor for safety reasons.

In the foregoing example, the node may be configured to determine when the high-priority sensors senses a particular condition (e.g., a temperature exceeding a threshold or some other critical condition), and transmit a notification through the network in response to such condition. Such a message may be designated as a high-priority message for which the node may attempt to transmit at any time, including during a QoS window. Prioritizing the message such that it may be transmitted during the QoS window may help the message to be successfully received sooner than if the message is associated with a lower priority that does not permit it to be transmitted in the QoS window. Further, the node may be configured to refrain to transmit messages based on the low-priority sensor during the QoS window. When the nodes of the network behave in this manner, high-priority messages, such as the notification based on the high-priority sensor described above, may have a higher likelihood of successful transmission through the network since the transmission of at least some low-priority messages is prevented during the QoS window.

When messages are prioritized differently as described above, each node may store priority settings that are respectively associated with different types of messages where each priority setting indicates the priority for a certain type of message. When a node has a message to transmit, it may check the priority setting associated with the type of message to be transmitted and determine whether to transmit the message in a QoS window based on the priority setting.

Although the figures herein may show a specific order of method steps, the order of the steps may differ from what is depicted. Also, two or more steps may be performed concurrently or with partial concurrence. Variations in step performance can depend on the software and hardware systems chosen and on designer choice. All such variations are within the scope of the application. Software implementations could be accomplished with standard programming techniques, with rule based logic and other logic to accomplish the various connection steps, processing steps, comparison steps and decision steps.

It should be understood that the identified embodiments are offered by way of example only. Other substitutions, modifications, changes and omissions may be made in the design, operating conditions and arrangement of the embodiments without departing from the scope of the present application. Accordingly, the present application is not limited to a particular embodiment, but extends to various modifications that nevertheless fall within the scope of the application. It should also be understood that the phraseology and terminology employed herein is for the purpose of description only and should not be regarded as limiting.

Now, therefore, the following is claimed:

1. A node for use in a wireless mesh network implementing a quality of service (QoS) window for reducing network traffic during the QoS window, comprising:

memory for storing priority data indicating whether each of a plurality of messages to be transmitted by the node is prioritized for communication during the QoS window for the wireless mesh network, wherein the priority data indicates that at least a first message of the plurality of messages is prioritized for communication during the QoS window and at least a second message of the plurality of messages is not prioritized for communication during the QoS window; and at least one processor configured to determine whether to transmit at least the first message and the second message during the QoS window based on the priority data, wherein the at least one processor is configured to cause the node, based on the priority data, to wirelessly transmit at least the first message during the QoS window in an uncoordinated manner for which the node determines when to transmit the first message during the QoS window without time-division multiplexed (TDM) coordination of a timing of transmission of the first message with transmissions of other messages by other nodes prioritized for communication during the QoS window such that collisions of the first message with the other messages prioritized for communication during the QoS are possible, wherein the at least one processor is configured to cause the node to delay transmission of at least the second message based on the priority data until at least expiration of the QoS window, thereby preventing the second message from colliding with other messages transmitted by other nodes of the wireless mesh network during the QoS window.

2. The system of claim 1, wherein the at least one processor is configured to determine a timing of the QoS window based on a timing beacon received by the node.

3. The node of claim 1, wherein the node is configured to receive information from the wireless mesh network indicating a timing of the QoS window, and wherein the at least one processor is configured to control the timing of the QoS window for the node based on the information such that QoS window is synchronized across a plurality of nodes of the wireless mesh network.

4. A system for implementing prioritized quality of service (QoS) windows in a wireless mesh network, comprising:
a plurality of nodes configured to communicate wirelessly in an uncoordinated manner, each of the plurality of nodes configured to store priority data indicative of priorities associated with messages communicated by the plurality of nodes, wherein the priorities include at least a first priority and a second priority, and wherein each of the plurality of nodes is configured to: (1) determine an occurrence of the QoS window, (2) during the QoS window and based on the priority data, transmit first messages associated with the first priority by the priority data in an uncoordinated manner for which each respective node of the plurality of nodes determines when to transmit at least one of the first messages during the QoS window without time-division multiplexed (TDM) coordination of a timing of transmission of the at least one of the first messages with transmission of the first messages by other nodes during the QoS window such that collisions between the first messages are possible during the QoS window, and (3) during the QoS window and based on the priority data, refrain from transmitting second messages associated with the second priority by the priority data until at least expiration of the QoS window, thereby preventing the second messages from colliding with the first messages transmitted during the QoS window.

5. The system of claim 4, wherein the plurality of nodes are configured to determine a timing of the QoS window based on a timing beacon transmitted through the wireless mesh network.

6. The system of claim 4, wherein the plurality of nodes are configured to transmit, during a time period outside of the QoS window, messages associated with the first priority by the priority data and messages associated with the second priority by the priority data.

7. The system of claim 4, wherein the plurality of nodes are configured to synchronize the occurrence of the QoS window.

8. A method for use in a wireless mesh network, comprising:
wirelessly communicating among a plurality of nodes of the wireless mesh network in an uncoordinated manner;
storing in the plurality of nodes priority data indicative of priorities associated with messages communicated by the plurality of nodes, wherein the priorities include at least a first priority and a second priority;
determining, by each of the plurality of nodes, an occurrence of a quality of service (QoS) window for the wireless mesh network;
during the QoS window, transmitting by the plurality of nodes first messages associated with the first priority by the priority data in an uncoordinated manner for which each respective node of the plurality of nodes determines when to transmit at least one of the first messages during the QoS window without time-division multiplexed (TDM) coordination of a timing of transmission of the at least one of the first messages with transmission of the first messages by other nodes during the QoS window such that collisions between the first messages are possible during the QoS window; and
during the QoS window, delaying at each of the plurality of nodes second messages associated with the second priority by the priority data until at least expiration of the QoS window, thereby preventing the second messages from colliding with the first messages during the QoS window.

9. The method of claim 8, further comprising determining, by the plurality of nodes, a timing of the QoS window based on a timing beacon transmitted through the wireless mesh network.

10. The method of claim 8, further comprising transmitting, by the plurality of nodes during a time period outside of the QoS window, messages associated with the first priority by the priority data and messages associated with the second priority by the priority data.

11. The method of claim 8, further comprising synchronizing the occurrence of the QoS window across each of the plurality of nodes.

* * * * *